United States Patent [19]

Takahashi et al.

[11] Patent Number: 5,367,055
[45] Date of Patent: Nov. 22, 1994

[54] PROCESS FOR TREATING ZEIN CONTAINING MATERIAL

[75] Inventors: Hidekazu Takahashi; Kohji Yamada; Norimasa Yanai, all of Funabashi, Japan

[73] Assignee: Showa Sangyo Co., Ltd., Tokyo, Japan

[21] Appl. No.: 868,907

[22] Filed: Apr. 16, 1992

[30] Foreign Application Priority Data

Apr. 23, 1991 [JP] Japan .................................. 3-117893

[51] Int. Cl.$^5$ ................................. A23J 1/12
[52] U.S. Cl. .................. 530/373; 530/370; 530/372; 530/422; 426/656
[58] Field of Search ............... 530/424, 425, 422, 423, 530/373, 412, 350, 370, 372; 426/656

[56] References Cited

U.S. PATENT DOCUMENTS

| | | | |
|---|---|---|---|
| 3,535,305 | 10/1970 | Carter et al. | 530/373 |
| 5,021,248 | 6/1991 | Stark et al. | 426/531 |

FOREIGN PATENT DOCUMENTS

| | | |
|---|---|---|
| 0510537 | 10/1992 | European Pat. Off. . |
| 0551553 | 7/1993 | European Pat. Off. . |
| 50-16800 | 5/1975 | Japan . |
| 61-167700 | 7/1986 | Japan . |
| 63-185999 | 8/1988 | Japan . |

OTHER PUBLICATIONS

Industrial and Engineering Chemistry, vol. 33, pp. 394–398.
Seed Proteins Biochemistry, Genetics, Nutritive Value, pp. 271–287.
Evans, et al. Ind. Eng. Chem. 36 (5), 408–410 (1944).
The Merck Index, 11th Edition, 1989, Published by Merck & Co. Inc, p. 10016 (#10020).

*Primary Examiner*—Michael G. Wityshyn
*Assistant Examiner*—C. Sayala
*Attorney, Agent, or Firm*—Nikaido, Marmelstein, Murray & Oram

[57] ABSTRACT

Processes for treating a zein containing material to decrease inherent color and smell as well as for obtaining zein component therefrom, which is decreased in color tone and smell. The removal of color and smell is carried out by contacting the material with an aqueous acetone solution having acetone concentration which causes almost no dissolution of the zein component. An extraction of zein component from the raw material is carried out in a conventional manner, for instance, with use of an aqueous ethyl alcohol.

8 Claims, No Drawings

PROCESS FOR TREATING ZEIN CONTAINING MATERIAL

BACKGROUND OF THE INVENTION

1. Field of the Invention

The present invention relates to a process for treating a zein containing raw material followed by a zein extraction process, and more particularly, for treating the material to decrease smell and color tone thereof.

2. Related art

Zein is a main ingredient of corn proteins and dissolves in various alcohols and alkali solutions. Zein has adhesiveness and a property to form films and fibers. When a zein solution is coated by spraying, dipping or the like on an outer surface of an object and dried, a film is formed thereon. The film has excellent resistance to water, acid and heat as well as in electric insulation property. Therefore, zein has widely been employed as a raw material for preparing waterproof stuff for papers, paint for wood works, adhesive for plywood, damp-proofing agents, coating agent for foods and tablets (medicine), and the like.

Various processes have been proposed for extracting and purifying the zein.

In Jap. Pat. No. Sho 61 (year of 1986) - 167700 (A) and Martinue NiJhoff et al "Seed Proteins Biochemistry, Genetics, Nutritive Value", page 275-285 (1983), there are described extraction processes, wherein corn gluten meal or the like material containing the zein is extracted with 70-90% (V/V) ethyl alcohol, about 90% (V/V) isopropyl alcohol or a similar water-containing lower alcohol, then the alcohol is distilled out to obtain the zein. In Jap. Pat. No. Sho 50 (year off 1975)-16800(B), there is described a process, wherein the zein is extracted from wheat gluten with 60-95% (V/V) aqueous acetone, methylethylketone or diethylencglycol solution and stirring at temperature of 50-70° C., which is an application of Carter et al., related art to U.S. Pat. No. 3,535,305.

The zein obtained by the above conventional processes has an inherent color and smell and thus can not sufficiently satisfy recent severe requirements for lack of odor and color in food and medicine preparation industries. Besides, it is difficult to stably supply the zein product with consistent quality, because of a fluctuation in the quality of raw materials, when such a conventional process is applied for.

As processes for purifying zein, there are those wherein the zein containing alcohol or alkali solution is cooled to cause a precipitation of the zein and the resulting block-like precipitate is dried ["Industrial and Engineering Chemistry", Vol. 33, No. 3, page 394 (1941)], and wherein the zein solution is poured into water or a salt solution, for instance sodium chloride solution, to cause a precipitation of the zein, and the resulting precipitate is dried to obtain the zein product which has good solubility in ethyl alcohol [Jap. Pat. No. Sho 63 (year of 1988)-185999(A)].

The former process has disadvantages in that the block-like precipitate is difficult to wash and the solution should be kept at the temperature of −20° C. or below to avoid denaturation of the zein due to water contained therein. The severe cooling condition and subsequent drying increase cost. The latter purification process has also disadvantages in that the color and smell can not sufficiently be removed, cooling reservation of the precipitate is required to avoid denaturation and freeze-drying of the precipitate requires an increase in cost.

SUMMARY OF THE INVENTION

Therefore, an object of the present invention is to provide a process for pre-treating a zein containing raw material which remarkably decreases the smell and color tone thereof.

Another object of the invention is provide a process for obtaining a zein component which is decreased in smell and color tone. Another object of the invention is to provide a process for extracting the smell and color tone from a zein containing material by an aqueous acetone solution without the zein component being dissolved into the solution before the extraction.

According to the invention, the object can be attained by a process for treating a zein containing raw material, which comprises steps of contacting the zein containing material with 70-100% (V/V) aqueous acetone solution at temperature of 25-60° C., separating the zein-containing material and then drying it.

"Zein containing raw material" is defined as pulverized corn, pulverized wheat, gluten meal and the like as well as various crude zein produces prepared in accordance with a conventional method by using at least one of those as a raw material. As the method for contacting the raw material with the acetone solution, there are conventional ones such as dipping, mixing, stirring, refluxing and the like, and one of those can be selected by taking factors of handling cost and others into consideration. The concentration of acetone solution which can be used in the present invention depends on the kind of raw material and moisture or water content thereof, but it is preferable to use 70-100%. Preferably 85-98% (V/V) solution is used for pulverized corn and gluten meal-like raw materials, and 90-100% and more preferably 92-98%(V/V) solution for crude zein products. When an acetone solution of a concentration lower than 70% (V/V) is employed, at least a part of the zein component elutes into the acetone solution which causes loss, and the viscosity of the resulting solution increases which makes the solution difficult to handle. The reason that the acetone solution is kept at a temperature of 25-60° C. lies in suppressing the elution of zein into acetone solution and preventing the increase in viscosity of the solution. In this viewpoint, it is preferable to keep the temperature of the acetone solution in a range of 30-60° C.

The above process can be combined with a step for extracting the zein component. This extraction step per se can be carried out in a conventional manner with an aqueous alcohol solution or alkali solution, as pre- or post-treatment of the treatment with acetone, or both stages.

As the alcohol solution, it is preferable to use about 90% (V/V) aqueous ethyl alcohol at a temperature of 30-75° C.

The invention will now be further explained in more detail and concretely with reference to Examples, Comparative Examples, and Comparative Test Example.

EXAMPLE 1

To 100g of gluten meal, 500ml of 80% (V/V) aqueous acetone solution was added and immersed at 45° C. for 4 hours. After filtration, the gluten meal was dried in vacuo and its smell and color were evaluated by a professional panel.

Results are shown in the following Table 1.

TABLE 1

| Persons (*) | Before Treatment 0 | | | After treatment 12 | | |
|---|---|---|---|---|---|---|
| | L | a | b | L | a | b |
| Hue | 67.4 | −0.4 | 15.6 | 80.5 | −0.8 | 11.4 |

In Table 1,
*: Number of persons whose reply was more excellent,
L: Lightness,
a: Index showing intensity of color tone from red (+) to green (−), and
b: Index showing intensity of color tone from yellow (+) to blue (−).

EXAMPLE 2

To 20kg of processed zein prepared by the process disclosed in Jap. Pat. No. Sho 63 - 185999 (A), 140 liter of 98% (V/V) aqueous acetone solution was added and stirred at 30° C. for 1 hour. After filtration, the resulting solid was dried in vacuo to check a smell by a professional panel and a hue thereof. Results are shown in the following Table 2.

TABLE 2

| Persons (*) | Before Treatment 0 | | | After treatment 12 | | |
|---|---|---|---|---|---|---|
| | L | a | b | L | a | b |
| Hue | 94.0 | −2.4 | 19.8 | 94.3 | −1.8 | 11.4 |

In Table 2,
*: Number of persons whose reply was more excellent,
L: Lightness,
a: Index showing intensity of color tone from red (+) to green (−), and
b: Index showing intensity of color tone from yellow (+) to blue (−).

EXAMPLE 3

To 100 g of gluten meal, 500 ml of 90% (V/V) aqueous ethyl alcohol solution was added and stirred at 60° C. for 2 hours, while keeping pH in the range of 8.8-8.5 by intermittently adding 1N-NaOH solution. The resulting solution was centrifuged to remove solids and the solution was filtered. The filtrate was concentrated to dryness in vacuo and a yellowish solid with an inherent strong smell was obtained.

The solid was milled to add the same into 98% (V/V) aqueous acetone solution of 5 folds in volume and stirred at 35° C. for 4 hours. Thereafter, the suspension was centrifuged to recover solids and dried in vacuo to afford the desired zein product (Purity as protein : 91.2%, Yield : 21.5%).

EXAMPLE 4

To 100g of gluten meal, 500ml of 90% (V/V) aqueous acetone solution was added and stirred at 40° C. for 2 hours. After filtration, the gluten meal was dried by the air to remove the remaining acetone. The resulting solid was added into 500 ml of 90% (V/V) aqueous ethyl alcohol solution and stirred at 60° C. for 2 hours, while keeping the pH in a range of 8.8-8.5 by intermittently adding 1N-NaOH solution. The resulting solution was centrifuged to remove solids and the solution was filtered.

The filtrate was concentrated to dryness in vacuo. The obtained zein product had a purity of 90.8% of protein, Yield of 20.3%).

EXAMPLE 5

To 100 g of gluten meal, 500ml of 80% (V/V) aqueous acetone solution was added and stirred at 40° C. for 2 hours. After filtration, the gluten meal was dried air to remove remaining acetone. The resulting solid was added into 500 ml of 90% (V/V) aqueous ethyl alcohol solution and stirred at 60° C. for 2 hours, while keeping the pH in a range of 8.8-8.5 by intermittently adding 1N-NaOH solution. The resulting solution was centrifuged to remove solids and the solution was filtered.

The filtrate was concentrated until its solid concentration became 20%. The concentrate was added dropwise into chilled water of 10 folds in volume to precipitate a zein component therein. The precipitate was centrifuged. The obtained zein product had purity as protein : 96.7%, Yield : 15.9%).

COMPARATIVE EXAMPLE 1

To 100g of gluten meal, 500ml of 90% (V/V) aqueous ethyl alcohol solution was added and stirred 60° C. for 2 hours, while keeping the pH in the range of 8.8-8.5 by intermittently adding 1N-NaOH solution. The resulting solution was centrifuged to remove solids and the solution was Filtered. The filtrate was concentrated to dryness. The obtained zein product had purity as protein : 86.1%, Yield : 23.9%.

COMPARATIVE EXAMPLE 2

To 100g of gluten meal 500 ml of 90% (V/V) aqueous ethyl alcohol solution was added and stirred at 60° C. for 2 hours, while keeping the pH in the range of 8.8-8.5 by intermittently adding 1N-NaOH solution. The resulting solution was centrifuged to remove solids and the solution was filtered.

The filtrate was concentrated until its solid concentration became 20%. The concentrate was added dropwise into chilled water of 10 folds in volume to precipitate a zein component therein. The precipitate was centrifuged. The obtained zein product had purity as protein : 97.24, Yield : 16.24.

TEST EXAMPLE 1 g of each zein product obtained by Examples 3-5 and Comparative Examples 1 and 2 was dissolved in 90% (V/V) aqueous ethyl alcohol of 20 folds and a hue of the solution was measured, with use of a hue meter having a cell of 1 inch in height.

Besides, the sample of each zein product was milled to prepare particles of 100 - 150 mesh. Each of the pulverized samples was put into a vial (diameter : 1.5 cm × height 3 cm) and sealed to heat at 30° C. for 10 minutes. Then, the smell of the sample was evaluated with 10 a steps graduation method from very strong to very weak in smell.

Results are shown in the following Table 3. From results shown in the Table, the inherent yellowish color and smell of the zein could effectively be removed by the process according to the invention.

TABLE 3

| Sample | Hue | Smell |
|---|---|---|
| Example | | |
| 3 | 6.8 | 3 |
| 4 | 5.1 | 1 |
| 5 | 6.2 | 3 |
| Comparative Example | | |
| 1 | 41.5 | 10 |
| 2 | 24.5 | 9 |

What is claimed is:

1. A process for pre-treating a zein-containing material, prior to extracting and purifying, which consists essentially of the steps of contacting the zein-containing material with (1) a 80–100% (V/V) acetone solution at a temperature of 25–60° C., or (2) a 70–80% (V/V) acetone solution at a temperature of 25–40° C., and separating the resulting solid from the solution.

2. A process as claimed in claim 1, wherein said zein-containing material is corn or gluten meal.

3. A process as claimed in claim 1, wherein said acetone solution has a concentration of 80–100% (V/V) and is kept at a temperature of 40–60° C.

4. A process as claimed in claim 3, wherein said zein-containing material is corn or gluten meal.

5. A process for pre-treating a zein-containing material, prior to extracting and purifying, which comprises the steps of contacting the zein-containing material with a 85–98% (V/V) acetone solution at a temperature of 25–60° C., and separating the resulting solid from the solution.

6. A process as claimed in claim 5, wherein said zein-containing material is corn or gluten meal.

7. A process as claimed in claim 5, wherein said acetone solution is kept at a temperature of 40–60° C.

8. A process as claimed in claim 2, wherein said acetone solution is kept at a temperature of 50–60° C.

* * * * *